Oct. 31, 1967   R. S. SPROULE   3,350,059
ANTI-CIRCULATION SEAL
Filed Oct. 20, 1966

ROBERT STANLEY SPROULE
INVENTOR.

BY
Agent

United States Patent Office 3,350,059
Patented Oct. 31, 1967

3,350,059
ANTI-CIRCULATION SEAL
Robert Stanley Sproule, Montreal, Quebec, Canada, assignor to Dominion Engineering Works, Limited, Lachine, Quebec, Canada, a corporation of Canada
Filed Oct. 20, 1966, Ser. No. 588,077
2 Claims. (Cl. 253—26)

ABSTRACT OF THE DISCLOSURE

The head cover of a turbine having an aerated crown shroud space and a drainage manifold thereabove to receive shroud tip leakage is provided with a drainage path into the draft tube by way of the runner hub, including a centrifugal seal surface at the radially inner end of the aeration space to prevent ingress and recirculation of leakage water into the shroud space, and to provide centrifugal pumping of drainage water to the hub outlet.

---

Figures 1, 2:
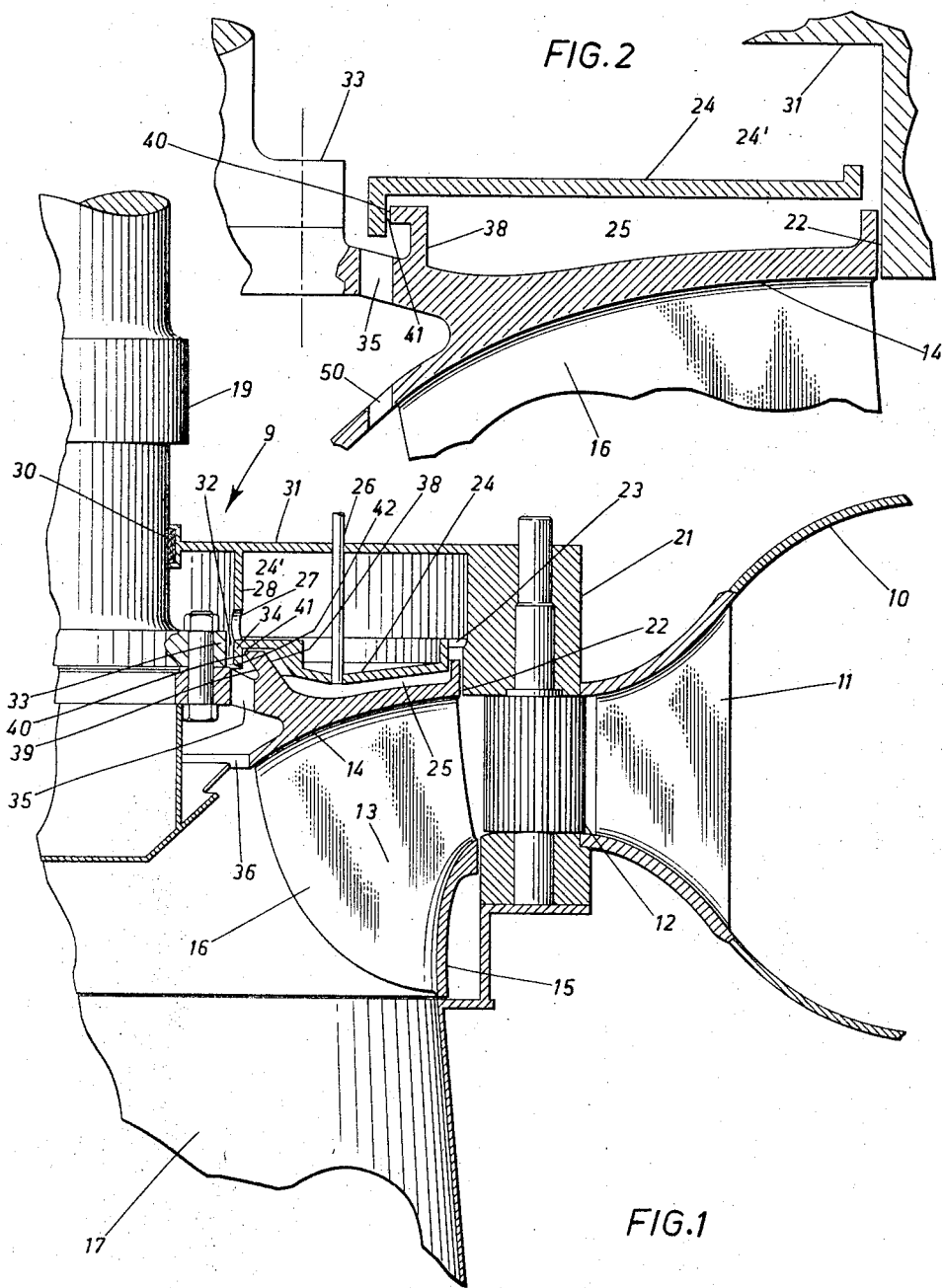

This invention is directed to a seal for a rotary hydraulic machine, and is specifically directed to an anti-circulation seal for the crown shroud of a rotary hydraulic machine such as a Francis turbine or centrifugal pump.

Means have previously been provided whereby the annular space between the head cover and the crown shroud of machines such as Francis turbines may be aerated in order to reduce frictional water drag on the runner of the machine. In certain machines of this type, leakage water enters the head cover of the machine, necessitating drainage of the water from this space. A first system which might be effective involves piping the leakage water from the head cover manifold space to the draft tube downstream of the turbine by way of the turbine pit liner and the outside of the spiral casing. This method is both expensive and inconvenient owing to the length of piping required and the probable creation of undesirable back pressure on the water in traversing the spiral casing. In addition, this method of drainage would sometimes require use of an air compressor in order to aerate the crown shroud space where otherwise such a compressor might not be necessary.

A second method of drainage which has been practiced involves draining the head cover manifold through balancing holes of the rotor into the draft tube. In practice, it has been found that while a considerable amount of leakage water can thus be drained through the balancing holes of the rotor, there is a tendency for some of the drainage water to escape into the shroud space above the crown shroud, despite the provision of an anti-circulation seal at the juncture of the crown shroud and the head cover.

An object of the present invention is to provide an improved anti-circulation seal for rotary hydraulic machines having shrouded runners and utilizing aeration of the shroud space.

The present invention provides in a hydraulic machine having a runner with a crown shroud mounted thereon for rotation within a head cover of the machine and defining an aerated substantially water free shroud space therewith, and having drain means to conduct leakage water from a manifold in the head cover to a drainage passage means extending downwardly through the runner, an anti-circulation seal, comprising in combination an annular wall portion extending downwardly from the head cover positioned radially outwardly of the drain means together with an annular flange portion of the shroud extending in axial overlapping relation outside the head cover wall portion and having a radially innermost annular lip portion joined to the drainage passage means extending through the shroud by a downward and radially outwardly extending wall portion, whereby working liquid flowing downwardly from the head cover is moving radially outwardly and downwardly along the wall portion on contact with the runner due to centrifugal effect.

The present invention is further described by way of example, reference being had to the accompanying drawings, wherein:

FIGURE 1 is a portion of a cross-sectional elevation of a rotary hydraulic machine incorporating an anti-circulation seal according to the present invention; and FIGURE 2 is a corresponding diagrammatic cross section illustrating the fundamental component relative geometry involved.

Referring to the drawings, portions of the Francis turbine 9 illustrated include a spiral casing 10 surrounding a runner 13, having a head cover 21 in sealing relation therewith, from which the runner shaft 19 protrudes.

The runner 13 is provided with a crown shroud 14 and a lower or band shroud 15, with the runner blades 16 extending therebetween.

The head cover 21 which seals the upper portion of the machine includes a lower wall 24 and an upper wall 31, which between them define a manifold 24'.

The crown shroud 14 defines with the manifold wall 24 a shroud space 25, which is aerated by the admission of air through the pipe 26.

When operating as a turbine, water enters from the spiral casing 10 and is directed by the stay vanes 11 and adjustable wicket gates 12 to flow through the runner 13, and thence downwardly through the draft tube 17 beneath the rotor 13.

Due to restricted clearance a seal effect is obtained at the runner outer periphery at the clearance 22 between the crown shroud 14 and the head cover 21. Water leaking past this seal flows upwardly into the manifold 24' by way of openings 23. It is prevented by centrifugal action from flowing directly from clearance 22 to shroud space 25. This leakage water flows inwardly through the manifold 24', and leaves the manifold by way of the drain port 27 which extends through the interior wall 28 of the head cover 21. The leakage water then flows downwardly through an annular passage 32 formed by the clearance between the shaft flange 33 and an annular extension 34 of head cover 21, to pass through drain holes, provided by the balancing holes 35 and the cone slots 36 of the runner in FIGURE 1 and the drain hole 50 of FIGURE 2, corresponding therewith.

The improved seal structure is formed of an upstanding flange portion 38 of the crown shroud 14 having an inwardly inclined inner annular surface 39 terminating at a tip or lip 40 at its radially innermost portion, and forming a running clearance 41 between itself and the head cover extension 34. The radially outermost portion of the balancing holes 35 and the cone slots 36 are spaced from the main axis of the machine a radial distance at least equal to the radial spacing of the lip 40 from the machine axis, so as to provide unobstructed water flow passage downwardly from the proximity of the lip to the outlet at the cone slots 36.

In operation, the shroud space 25 is cleared of water by the admission of air thereto through the pipe 26. A rotating water seal is established at the clearance 22, and water leaking past this point passes by way of holes 23 into the manifold 24'. This leakage water then circulates inwardly from the manifold through the drainage port 27, downwardly past the runner boss through the clearance 32, past the tip 42 of the annular extension wall 34 and on to the sloping wall 39 of the annular seal flange 38. From here the water is pumped centrifugally and flows by gravity downwardly through the balancing holes 35 and cone slots 36, and thence through the runner to the draft tube.

In order to achieve the desired equilibrium within the shroud space 25, it will be understood that the air pressure supplied by the air pipe 26 will be at least as high as the water pressure occurring in the rotor 13 as slots 36.

It is contemplated that the present invention may have particular value in power plants where there is deep submergence of the turbine and compressors are necessary to provide air for runner crown aeration. The present invention, in addition to materially reducing the quantities of air required for such crown aeration also makes possible the reduction in the size of plant required.

What I claim as new and desire to secure by Letters Patent of the United States is:

1. A hydraulic turbo machine having a runner rotatably mounted within a stationary housing, said runner having a hub, an annular crown shroud attached thereto positioned in facing relation with a portion of the housing head cover to define a crown aeration space therewith, runner blades extending oppositely of said aeration space from said shroud to form main flow paths for working liquid between adjacent blades, a manifold within said head cover adjacent said aeration space and remote from said shroud to receive working liquid leaking axially past the radially outer edge portion of the shroud, a manifold leakage orifice connecting a radially inner portion of said manifold with the draft tube by way of a hub outlet located outwardly of said orifice, and a stationary leakage flow-guiding member extending from adjacent said orifice towards said hub outlet in axial overlapping relation with an annular flange portion of said shroud located outwardly of the member relative to the runner main axis, a portion of said shroud flange overlapped by said member extending inwardly to a reduced radius of rotation to provide an inwardly extending centrifugal flow barrier bounding said aeration space, and forming a leakage path extending axially from said member at an increasing radius of rotation towards said hub outlet whereby said leakage liquid is centrifugally propelled to said outlet.

2. The hydraulic machine as claimed in claim 1 wherein said flow guiding member comprises an annular flange extending substantially parallel with said runner main axis, the radially inner surface of the flange constituting a portion of said leakage path.

References Cited

UNITED STATES PATENTS

| | | | |
|---|---|---|---|
| 1,516,822 | 11/1924 | McCormack | 253—26 X |
| 1,860,618 | 5/1932 | Nagler | 253—117 X |
| 2,914,301 | 11/1959 | Hess | 253—117 |
| 3,081,975 | 3/1963 | Sproule et al. | 253—26 |
| 3,253,816 | 5/1966 | Sproule | 253—26 |

EVERETTE A. POWELL, JR., *Primary Examiner.*